March 14, 1950 H. G. RÜDENBERG 2,500,574

ELECTRONIC TUBE CIRCUIT FOR HIGH-FREQUENCY

Filed April 27, 1944 6 Sheets-Sheet 1

INVENTOR

H. Günther Rüdenberg

BY David Rines

ATTORNEY

March 14, 1950 H. G. RÜDENBERG 2,500,574

ELECTRONIC TUBE CIRCUIT FOR HIGH-FREQUENCY

Filed April 27, 1944 6 Sheets-Sheet 2

INVENTOR
H. Günther Rüdenberg
BY David Rines
ATTORNEY

March 14, 1950 H. G. RÜDENBERG 2,500,574

ELECTRONIC TUBE CIRCUIT FOR HIGH-FREQUENCY

Filed April 27, 1944 6 Sheets-Sheet 3

INVENTOR
H. Günther Rüdenberg
BY
David Rines
ATTORNEY

March 14, 1950 H. G. RÜDENBERG 2,500,574

ELECTRONIC TUBE CIRCUIT FOR HIGH-FREQUENCY

Filed April 27, 1944 6 Sheets-Sheet 4

INVENTOR
H. Günther Rüdenberg
BY David Rines
ATTORNEY

INVENTOR
H. Günther Rüdenberg
BY David Rines
ATTORNEY

March 14, 1950 — H. G. RÜDENBERG — 2,500,574

ELECTRONIC TUBE CIRCUIT FOR HIGH-FREQUENCY

Filed April 27, 1944 — 6 Sheets-Sheet 6

INVENTOR
H. Günther Rüdenberg
BY David Rines
ATTORNEY

UNITED STATES PATENT OFFICE 2,500,574

ELECTRONIC TUBE CIRCUIT FOR HIGH FREQUENCY

Hermann Günther Rüdenberg, Belmont, Mass.

Application April 27, 1944, Serial No. 533,027

24 Claims. (Cl. 250—27)

The present invention relates to electric systems, and more particularly to systems employing electron-discharge devices. The invention is more particularly related to extremely-high-frequency systems.

High-frequency tubes have been subject to various disadvantages, particularly the considerable transit time of the electrons and the relatively high electrode capacitances. In the endeavor to overcome some of these disadvantages, it has been attempted to reduce the size of the tubes, but this has been attended by a consequent reduction of power.

An object of the invention is to provide a new and improved high-frequency system employing a novel transverse-control electron tube of relatively large dimensions in order to handle large amounts of power.

Another object is to provide a new and improved high-frequency system employing a novel electron-beam deflection tube in which the formation of voltage and current waves along the lengths of the deflecting control electrodes and along the lengths of the anodes shall be utilized.

Still another object is to provide a new and improved high-frequency system employing a novel tube of the above-described character that shall operate over a large range of frequencies and electron-transit times.

Still another object is to provide a new and improved high-frequency system having great flexibility and efficiency.

Still a further object is to provide a new and improved high-frequency system employing the production and utilization of waves, in an electron beam, that are transverse to both the direction of motion of the electrons and the longitudinal extension of the beam, the said direction of motion being perpendicular to the direction of the said longitudinal extension.

Among the objects of the invention are to provide a new and improved high-frequency system of the above-described character that may be used to produce amplification, oscillation, detection, rectification, frequency changes, etc.

Other and further objects will be explained hereinafter and will be particularly pointed out in the appended claims.

Figure 1:
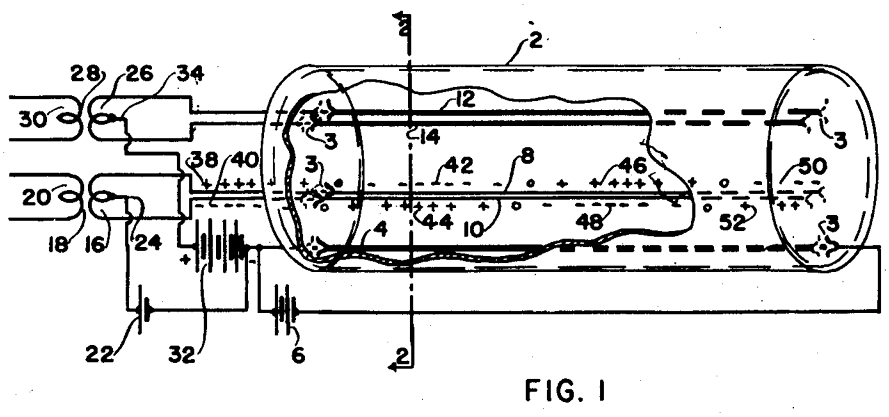
Figure 2:
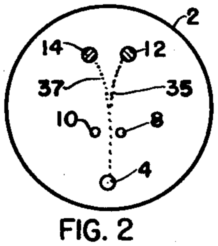
Figure 3:
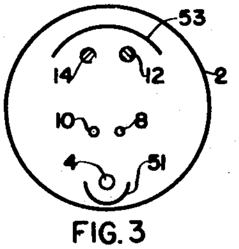
Figure 4:
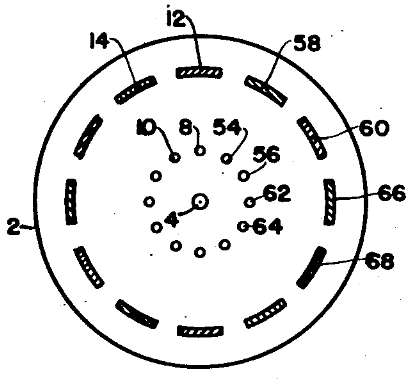
Figure 5:
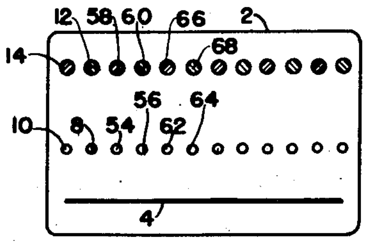
Figure 6:
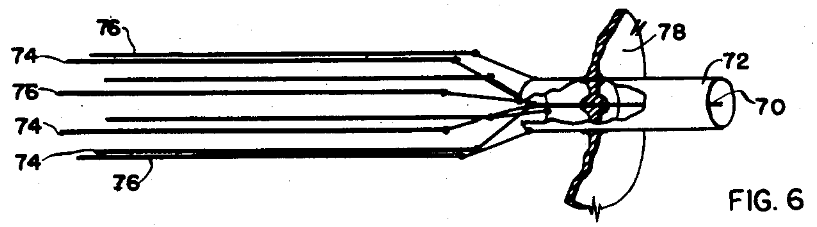
Figure 7:
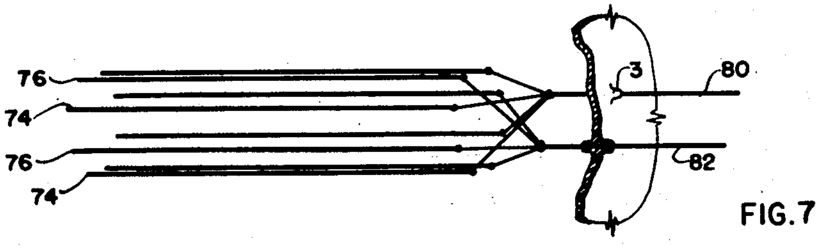
Figure 8:
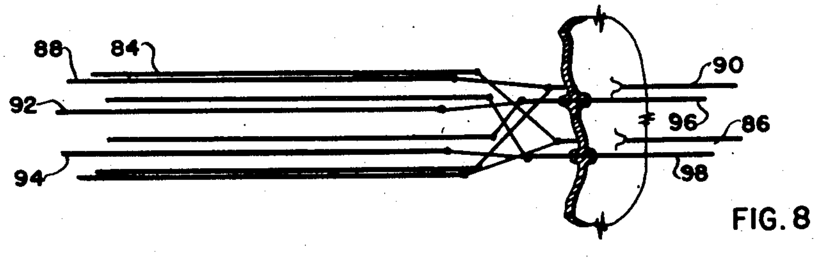
Figure 9:
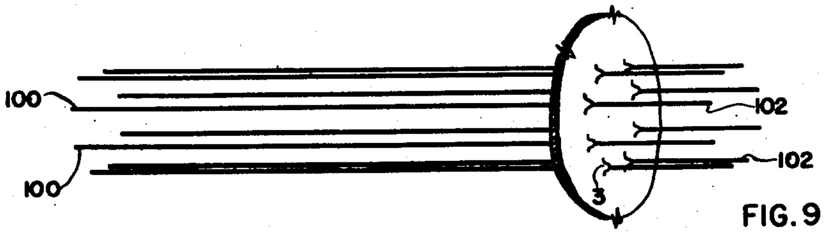
Figure 31:
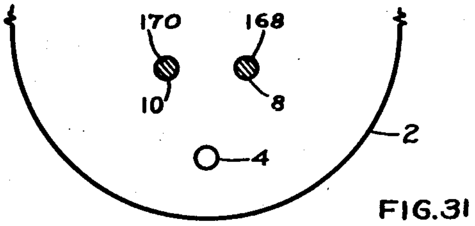
Figure 10:
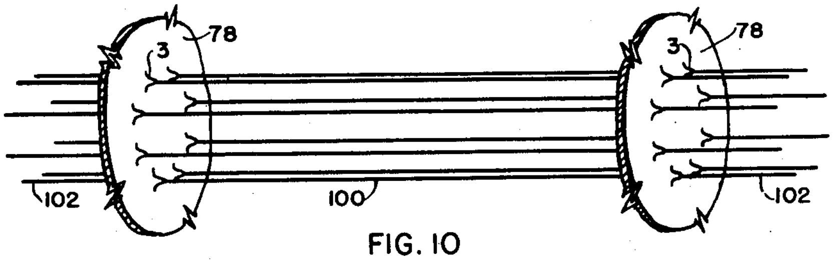
Figure 11:
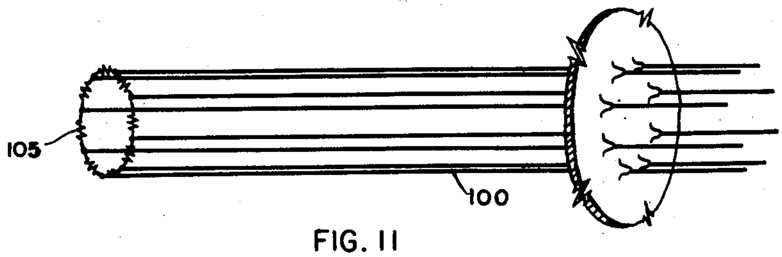
Figure 12:
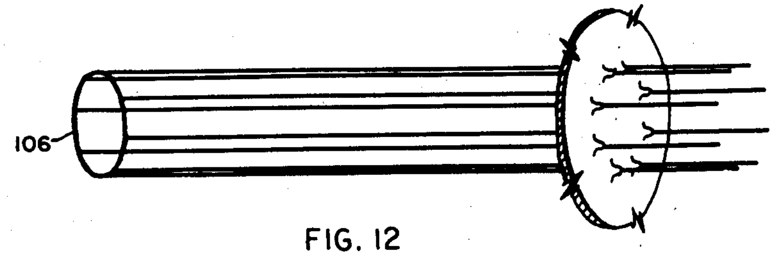
Figure 13:
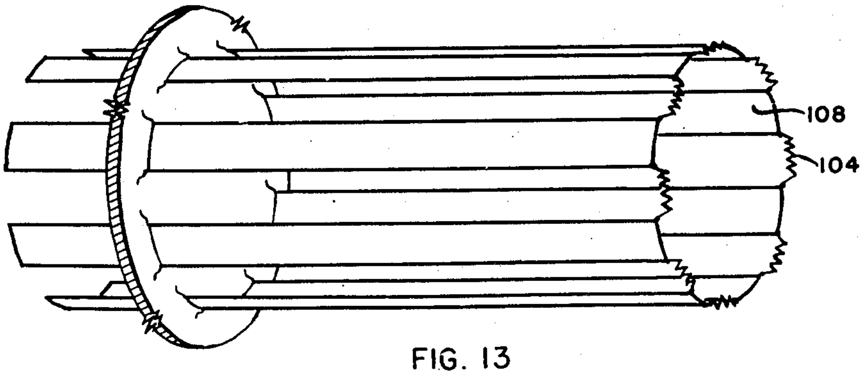
Figure 14:
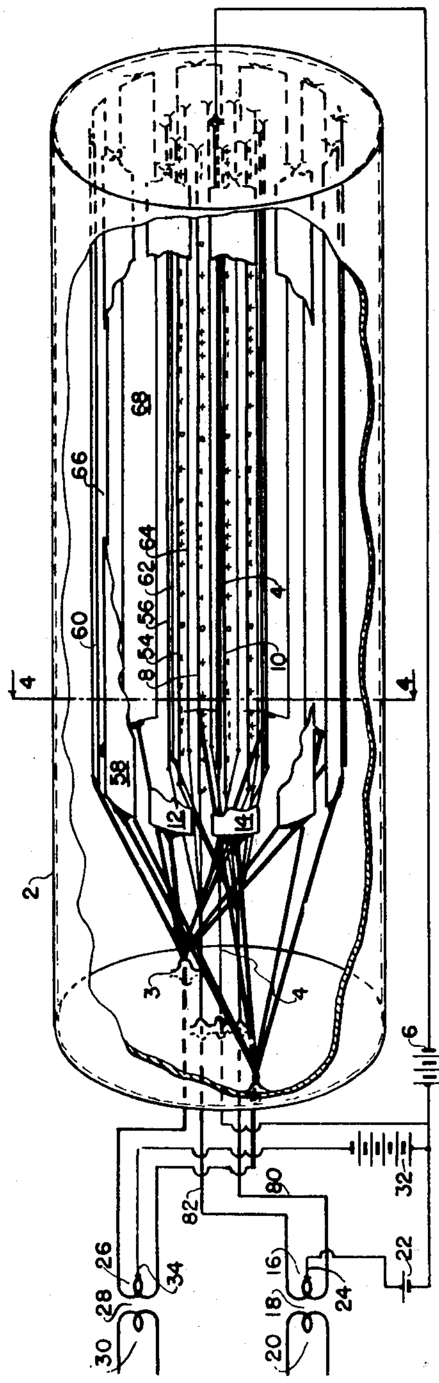
Figure 15:
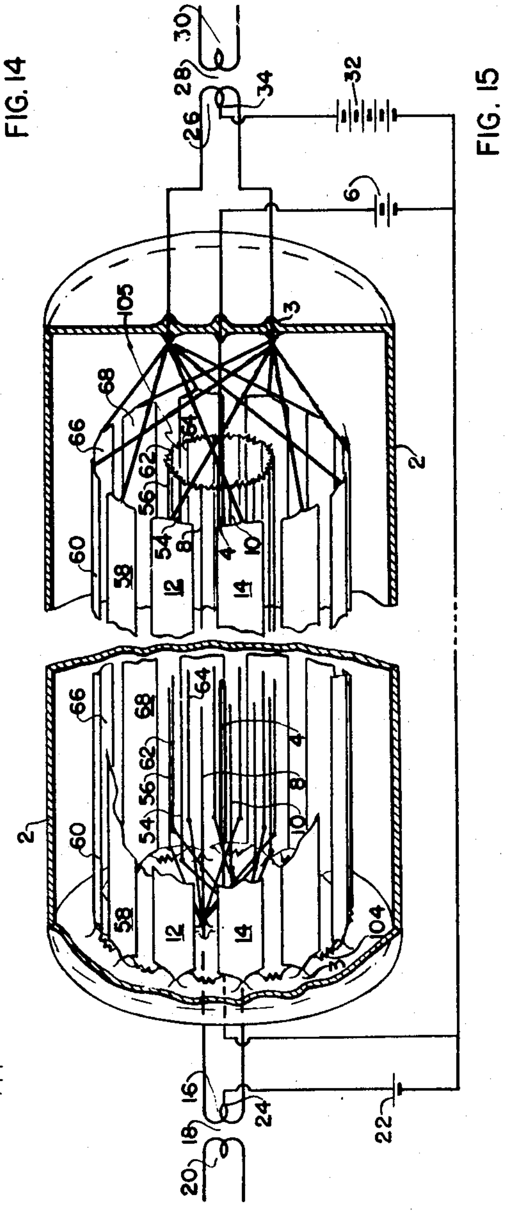
Figures 16, 17:
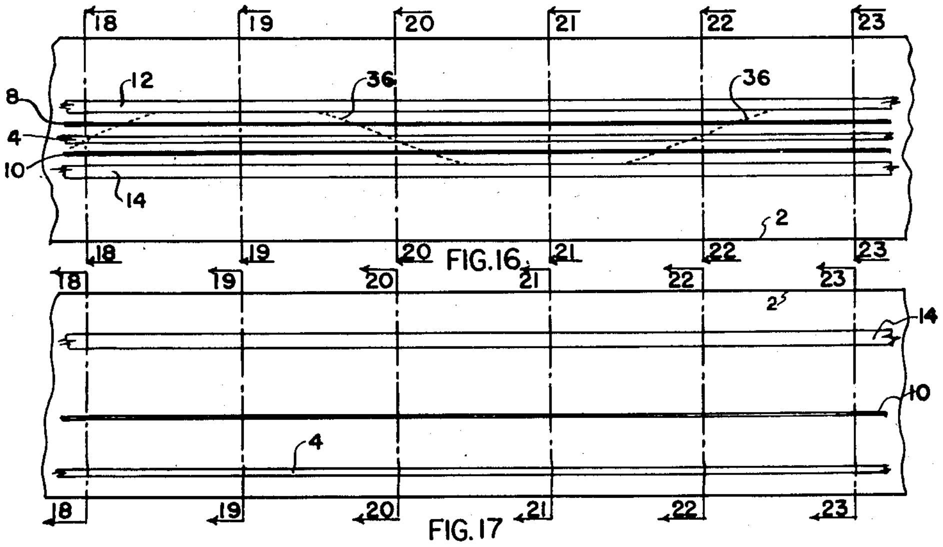
Figure 18:
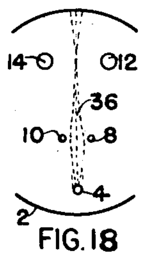
Figure 24:
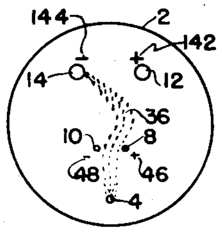
Figure 25:
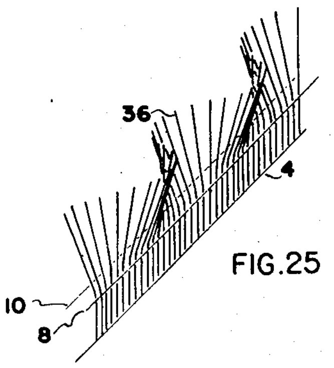
Figure 30:
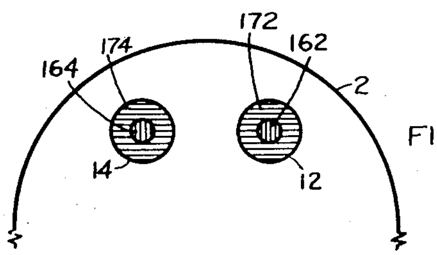
Figure 26:
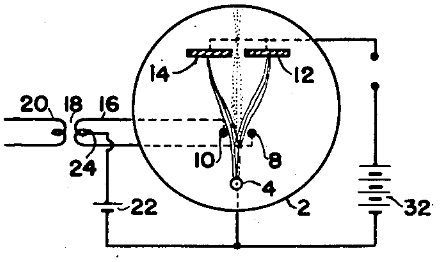
Figure 27:
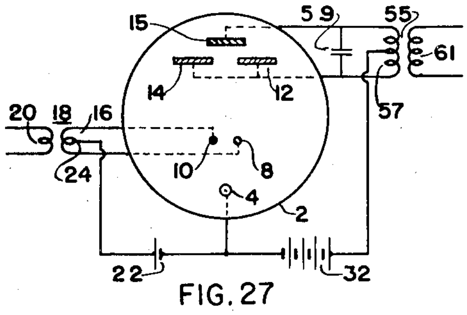
Figure 28:
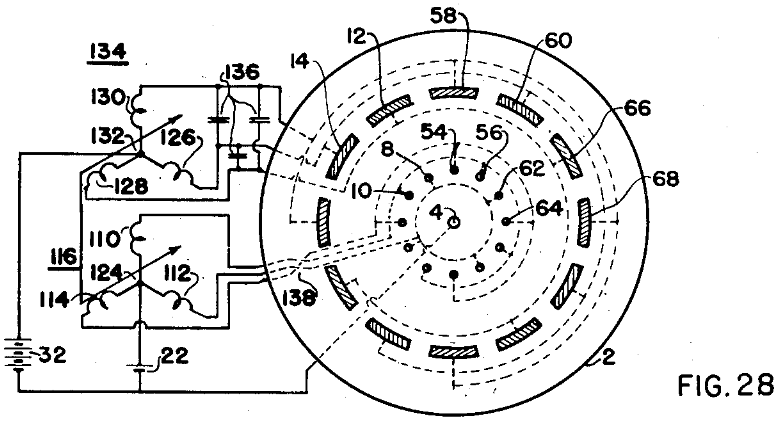
Figure 29:
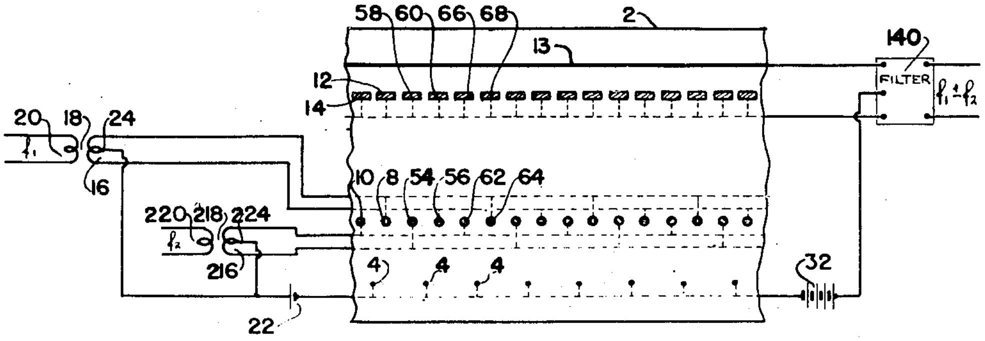

The invention will now be more fully described in connection with the accompanying drawings, in which Fig. 1 is a diagrammatic view of circuits and apparatus embodying the invention, the apparatus being shown in perspective, and the cylindrical envelope of the novel high-frequency tube being shown partly broken away, for clearness; Fig. 2 is a cross-section taken upon the line 2—2 of Fig. 1, looking in the direction of the arrows, showing, by dotted lines, the paths traveled by electrons from the cathode at two instants of time, to illustrate time phase; Fig. 3 is a section similar to Fig. 2 of a modification; Fig. 4 is a similar cross-section of a further modification, taken upon the line 4—4 of Fig. 14, looking in the direction of the arrows; Fig. 5 is a cross-section of still another modification; Fig. 6 is a diagrammatic view illustrating a method of connecting a plurality of deflecting control electrodes to a coaxial transmission line in accordance with a feature of the present invention; Fig. 7 is a similar view illustrating the connections to a parallel-wire transmission line; Fig. 8 is a similar view showing connections to a four-wire system; Fig. 9 is a similar view showing individual connections to individual external wires; Fig. 10 is a view similar to Fig. 9 of a modification; Figs. 11 and 12 are similar views of further modifications; Fig. 13 is a view showing anodes corresponding to the control electrodes of Fig. 11; Fig. 14 is a diagrammatic view similar to Fig. 1 of a further modification, showing terminations as illustrated in Fig. 7; Fig. 15 is a similar diagrammatic view embodying the impedances illustrated in Figs. 11 and 13; Fig. 16 is a fragmentary plan of the tube and the electrodes illustrated in Fig. 1; Fig. 17 is a corresponding elevation; Figs. 18, 19, 20, 21, 22 and 23 are sections for illustrating space phase, the sections being taken upon the lines 18—18, 19—19, 20—20, 21—21, 22—22, and 23—23, respectively, of Fig. 6 or Fig. 17, looking in the direction of the arrows, with dotted lines to show the approximate paths of the electrons at a particular instant of time; Fig. 24 is a section similar to Fig. 23, but showing the electron paths, at a particular instant of time, at a very much higher frequency; Fig. 25 is a diagrammatic perspective of an electron beam wave curtain, showing roughly the paths traveled by the electrons in the tube of Fig. 1 at a particular instant of time; Fig. 26 is a diagrammatic view illustrating a tube according to the present invention connected into a circuit to operate as a nonlinear device, such as a rectifier, the heater connections to the cathode being omitted, for simplicity; Figs. 27 to 29, inclusive, are similar views showing connections for operation as a frequency multiplier or a detector, a three-phase oscillator and a mixer, respectively; and Figs. 30 and 31 are cross-sections similar to Fig. 2, illustrating further modifications of the anodes and the control electrodes.

In Fig. 1, there is shown a tube 2 having some characteristics similar to those of the cathode-ray oscilloscope. The tube 2 is shown provided with a cathode 4, a pair of deflecting cylindrical control-grid electrodes 8 and 10, and a pair of current-receiving anodes 12 and 14, all supported by insulation 3. For convenience, the control-grid electrode 8 and the anode electrode 12 may be termed a first pair of electrodes, and the control-grid electrode 10 and the anode electrode 14 may be termed a second pair of electrodes. The control-grid electrode 8 may be said to be associated with the anode electrode 12 of the first pair of electrodes 8, 12 and the control-grid electrode 10 may be said to be associated with the anode electrode 14 of the second pair of electrodes 10, 14. Though other types of cathodes for emitting electrons may also be employerd the cathode 4 is shown comprising a filament, heated by a battery 6. The cathode 4, the control electrodes 8 and 10, and the anodes 12 and 14 are shown extending longitudinally substantially throughout the length of the tube 2, and more or less parallel to one another. The control electrodes 8 and 10 are shown disposed between the cathode 4 and the anodes 12 and 14, and spaced from each other in a direction substantially transverse to lines connecting the cathode to the anodes. The plane through the control electrodes 8 and 10 and the plane through the anodes 12 and 14 should be approximately at right angles to the line joining the cathode to the mid-points between the control electrodes 8 and 10 and the anodes 12 and 14. The relative locations of the parts and the relative spacing of the control electrodes and the anodes should be such that electrons emitted by the cathode 4 may travel between, and approximately at right angles to, the control electrodes 8 and 10, toward the anodes 12 and 14.

At one end of the tube 2, the control electrodes 8 and 10 are shown connected together through the secondary winding 16 of an input transformer 18, the primary winding 20 of which may be supplied with an alternating input voltage from any suitable source (not shown) of alternating energy, continuous or pulsed. If extremely high frequencies, say, billions of cycles, are to be impressed upon the control electrodes 8 and 10, the coils of the transformer 18 may contain only a single turn each, or the transformer 18 may be replaced by a transmission line or other well-known elements. These modifications are not illustrated, because well understood by persons skilled in the art. The control electrodes 8 and 10 are shown connected to the cathode 4 through a focusing or biasing battery 22; the junction point 24 may be conveniently made at the mid-point of the secondary winding 16. As the said one end of the tube 2, input potentials of opposite polarity will be superposed over the focusing or bias potential on the control electrodes 8 and 10, respectively, by the input transformer 18.

Corresponding ends of the anodes 12 and 14 are similarly shown connected through the primary winding 26 of an output transformer 28, the secondary winding of which is shown at 30. The transformer 28 may, of course, be replaced by any other well-known element for taking the output energy from the anodes 12 and 14. The anodes are shown connected to the cathode 4 through a supply battery 32. The midpoint 34 of the primary winding 26 may serve as a suitable connecting point for the battery 32 to the anodes 12 and 14.

The focusing or bias circuit of the control system may be traced from the cathode 4, through the biasing battery 22, to the junction point 24; and thence, through the oppositely disposed halves of the secondary winding 16, to the control electrodes 8 and 10, respectively. The supply circuit of the anode system may be traced from the cathode 4, through the supply battery 32, to the junction point 34; and thence, through the oppositely disposed halves of the primary winding 26, to the anodes 12 and 14, respectively. Such focusing and supply circuits are well known to the art.

High-frequency variable input voltages impressed upon one end of the control electrodes 8 and 10 will produce charges of opposite polarity on these control electrodes. Alternately disposed positive and negative regions of charge will be spaced along each of the control electrodes 8 and 10, but the polarity of the charges in regions of one of the control electrodes will be opposite to the polarities on the oppositely disposed regions of the other control electrode at any particular instant of time. The manner in which the voltage waves are produced along the lengths of the control electrodes 8 and 10 will now be explained.

Tubes of the ordinary type, well known at the present time, do not operate well at extremely high frequencies, partly because the lumped interelectrode capacitances may shunt and bypass the output and even resonate with the leads and the electrode inductances. This is reduced in the acorn tubes by small over-all dimensions. The detrimental shunting and resonant effects of the electrodes may be controlled and even caused to disappear, however, according to the present invention, by making the cathode 4, the control electrodes 8 and 10 and the anodes 12 and 14 uniform; and longitudinally so extended, transverse, or approximately at right angles, to the electron flow, that they shall perform as lecher lines for standing or traveling waves. If these electrodes should extend beyond a quarter wavelength of the oscillation to be used, the control electrode 10 will have a region 44 that, at some particular instant of time, is positive with respect to a corresponding oppositely disposed region 42 of the control electrode 8, then a region 48 that is negative with respect to a corresponding oppositely disposed region 46, then a region 52 that is positive with respect to a corresponding oppositely disposed region 50, and so on. These successively disposed regions of alternately positive and negative charge will be spaced throughout the length of each of the control electrodes 8 and 10, separated by regions of zero charge, as indicated by the plus, minus and zero symbols in Fig. 1, and as shown in Figs. 19 to 24, inclusive. The alternately disposed positively and negatively charged regions of each control electrode may or may not be disposed opposite to the alternately disposed negatively and positively charged regions, respectively, of the other control electrode.

Let it be assumed that, at the cross-section determined by the line 2—2 of Fig. 1, in the plane of Fig. 2, electrons emitted from the cathode 4 travel along paths, two of which are indicated at 35 and 37, between the control elements 8 and 10, towards the anodes 12 and 14, respectively. Assuming further, in that cross section of Fig. 2, that the control electrode 10, during a half-cycle of the input voltage, has momentarily a more positive charge than the control electrode 8, the electrons will be attracted toward the control electrode 10 rather than to the control electrode 8, so as to reach the anode 14, rather than the anode 12, by way of the path 37. The electrons will thus travel past the control electrode 10 toward the anode electrode 14 of the pair of electrodes 10, 14. During the next half-cycle of the input voltage applied to the transformer 18, since the polarities of the charges upon the control electrodes 8 and 10, in that cross section of Fig. 2, will be reversed, the electrons will similarly reach the anode 12 rather than the anode 14, by way of the path 35. During this next half-cycle, therefore, the electrons will travel past the control electrode 8 toward the anode electrode 12 of the pair of electrodes 8, 12. The polarity of the charges in the oppositely disposed regions of the control electrodes may thus be periodically reversed. It is not essential that the electrons actually reach the anode electrodes, for they may induce charges in the anode electrodes through proximity thereto. By reason of the contribution of that cross section of Fig. 2, therefore, an alternating current will be set up in the output transformer 28 of a frequency and waveshape dependent upon the frequency and waveshape applied to the input transformer 18. Other cross sections disposed successively along the tube 2 will similarly contribute corresponding currents to the output transformer 28. These currents should have an appropriate phase displacement, however, that will compensate for the different Maxwellian retardation times of the currents on the anodes 12 and 14 between the places of origin of these currents and the transformer 28.

The electrons traveling from the respective regions of the cathode 4 toward the corresponding regions of the anodes 12 and 14, and deflected transversely at one particular time by the charges on the control electrodes 8 and 10, will not all be deflected so as to be received, in all cross sections of the tube of Fig. 1, by either the anode 12 or the anode 14. as would be the case with moderate frequencies. The electrons will be received by both these anodes, simultaneously in groups, namely, at regions of positive and negative charge corresponding to the regions of negative and positive charge, respectively, of the control electrodes 8 and 10. Alternately disposed positive and negative charges will be produced in the regions of the anode electrode of each of the pairs of electrodes 8, 12 and 10, 14, that are respectively disposed opposite to the corresponding negatively and positively charged regions of the control electrode of the corresponding pair of electrodes, and the charges may be reversed in synchronism with the reversal of the polarities of the charges of the control-electrode regions.

The diagrammatically shown paths 36 of travel of the electrons in some of these various cross-sections, at a particular instant of time, are illustrated in detail by Figs. 18 to 23. These figures show also the condition of charge, at one particular time, in different regions spaced along the electrodes. Because of the Maxwellian retardation time, the charges on the control electrodes 8 and 10, excited by a varying or alternating voltage applied, for example, at one end of these control electrodes, change in phase along the control electrodes. The charge is zero in the plane of the cross-section shown in Fig. 18. The charge is positive on the control electrode 10, and negative on the control electrode 8 in the cross-sectional plane of Fig. 19. The charge is again zero in the cross-section of Fig. 20. The charge is negative on the control electrode 10, and positive on the control electrode 8 in the plane of Fig. 21. The charge is zero in Fig. 22, the same as in Fig. 18. The charge is positive, once more, on the control electrode 10 and negative on the control electrode 8, in Fig. 23.

Figure 19:
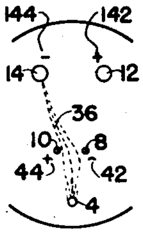
Figure 20:
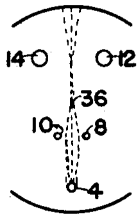
Figure 21:
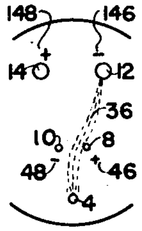
Figure 22:
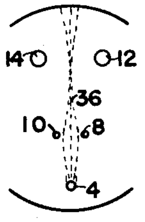
Figure 23:
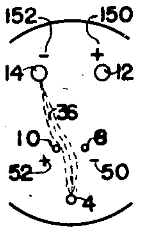

In Figs. 19 and 23, for example, the positive charges in the regions 44 and 52, respectively, on the control electrode 10, and the negative charges in the corresponding oppositely disposed regions 42 and 50, respectively, on the control electrode 8, will result in deflecting the electrons towards the anode 14, there producing negative charges in regions 144 and 152, and positive charges in regions 142 and 150, on the anode 12. The charged regions 144 and 152 may be disposed opposite, and respectively correspond, to the control-electrode regions 44 and 52. As further illustrated in Fig. 21, the positive and negative charges in the regions 46 and 48 on the control electrodes 8 and 10 will deflect the electrons towards the anode 12, there producing a negative charge in a region 146, and a positive charge in a region 148, on the anode 14. The charged regions 146 and 148 may be disposed opposite, and respectively correspond, to the control-electrode regions 46 and 48. Under the deflection forces of these charges on the control electrodes 8 and 10, the electron beam will be deflected to opposite sides, or not at all, as the case may be, at these various cross-sections, as shown by the dotted-line paths 36 in Figs. 18 to 23. The entire beam or sheet of electrons, therefore, at the particular instant, will have a curtain shape, as shown diagrammatically in Fig. 25.

This deflection thus varying along the longitudinal axis of the tube, however, represents the space phase at one instant of time only, with the electron beam in every alternate deflection zone traveling toward the anode 14 at one side, as represented by Figs. 19 and 23. A half-cycle later, however, the same deflection zones will be such as to travel toward the anode 12, on the other side, in the sections 19—19 and 23—23 of Figs. 16 and 17. At the intermediate zones, illustrated by Figs. 18, 20 and 22, the beam will travel toward neither the anode 12 nor the anode 14 at these instants of time, but will travel in between them. During their travel from the cathode toward the anodes, the electrons become thus deflected by the control electrodes in deflection zones alternately directed toward the respective anode electrodes to correspond to the respective positively and negatively charged regions of the control electrodes. Fig. 25 represents but one instantaneous phase of the resulting transversely oscillating electron-beam wave-curtain.

If, now, the system is to operate in unison, to yield a high-frequency output in the transformer 28, the natural wavelength of the current waves on the anodes 12 and 14 and the regions of negative charge 144, 146 and 152 should be nearly in step with the positions at which the oscillating electron current approaches these anodes. Each oppositely disposed pair of positive and negative regions of the anodes 12 and 14, such as 142 and 144, 145 and 148, 150 and 152, may be considered, in its effect, as a separate deflection tube. The output of the transformer 28 will then correspond to the combined outputs of these separate regions, with the correct phase. The phase differences of the charges along the lengths of the control electrodes 8 and 10 should be determined by the same Maxwellian retardation times, so that the currents delivered by the electron beam to the anodes 12 and 14 shall vary along the lengths of the anodes exactly in that phase displacement which is needed for simultaneous and cumulative arrival at the output transformer 28.

In order to attain the desired effect of the electrons reaching the anodes 12 and 14 in proper time for combination in the output transformer 28, the velocity of propagation of the waves along the anodes 12 and 14 should be substantially the same as that of the waves along the control electrodes 8 and 10, if the anodes and the deflecting control electrodes are of equal active length. It is not necessary, of course, that the charged regions be equally spaced. If these electrodes have unequal lengths, the velocities should be made such that the traveling times of the waves along the electrodes of each pair 8, 12 and 10, 14 of the anode and the corresponding control electrode shall be substantially the same. It may, in some cases, be desirable, toward this end of having the electron currents reach the anodes 12 and 14 in step with the waves already on these anodes, to make or coat the anodes or the control electrodes 8 and 10 with some material of increased dielectric constant or increased permeability or both, thus decreasing their wave velocity.

This is illustrated in Figs. 30 and 31. In Fig. 30, the anodes 12 and 14 are shown provided with supporting wires 162 and 164 which, in turn, have outer coatings 172 and 174, respectively, of some material of high dielectric constant and low wave velocity. The wave velocity on the control electrodes 8 and 10 of Fig. 31 may be decreased by constituting them, say, of wires 168 and 170, which have some permeability greater than unity. Either solid or coated electrodes, of either magnetic or dielectric material, may be used, separately, or in combination, for the control electrode, or for the anode lecher lines, or for both, to achieve an adjustment of the wave velocity in accordance with the present invention.

The alternately disposed positively and negatively charged regions are thus caused to travel along the control electrodes 8 and 10 to cause the electron-beam-wave-curtains to oscillate transversely in deflection zones travelling with these charged regions, and the alternately disposed positively and negatively charged regions of the anodes 12 and 14, corresponding to the negatively and positively charged regions, respectively, of the control electrodes 8 and 10, and to the respective deflection zones at the anodes, are caused to travel synchronously in timed relation thereto.

In each cross-section, the electrons will require a finite though small, time in which to travel from the control electrodes to the anodes. At extremely high frequencies, the phase of the charges on the control electrodes may change during this small time. In that event, the paths 36 may become modified, as illustrated by Fig. 24. There, at one particular time, the electrons causing the negative charge 144 by approaching the anode 14 have been previously attracted towards the control electrode 10 by the previously positive charge 44, which already has moved out of this cross section, while the electrons passing the control electrodes at the particular time illustrated are attracted by the positive charge 46 towards the control electrode 8, as the attracting positive phase of the charge has changed meanwhile from the control electrode 10 to the control electrode 8. The time of flight of the electrons from the control electrodes to the anodes will be the same in each cross-section, if the control electrodes are substantially parallel to the anodes, as shown, and this time delay will not have any adverse effect on the operation of the tube, whereas the time of flight of the electrons from the cathode to the control electrodes has no effect at all. This is in contrast to the detrimental effect of the transit times controlled by variations of the operating voltages of ordinary electron tubes.

Not only is means thus provided for producing the effect of a large number of small tubes in one tube, moreover, but also provision is made for the use of different or variable frequencies, and even pulsed or complex waves, which could not be obtained with a fixed number of such small tubes. The system above described will operate just as well with any low or high frequency, even though many full or fractional numbers of wavelengths may be formed on the electrode elements. The proper distribution of the waves takes place because the control electrodes 8 and 10 and the anodes 12 and 14, as before stated, operate as pairs of lecher lines. Voltage and current waves are formed along the lengths of these electrodes; consequently, the electron stream oscillates in transverse spatial waves in the axial direction of the tube, like a curtain, as shown diagrammatically in Fig. 25. The waves in the direction of the electrode extension may be standing waves or traveling waves or a combination of both, as determined by the impedances of the control and anode electrodes and their circuits.

The distance between the control electrodes 8 and 10 should preferably be smaller than the distance of these control electrodes from the anodes 12 and 14 or from the cathode 4. The effect of the alternating fields produced by the opposite charges on the control electrodes 8 and 10 will then be small at both the cathode 4 and at the anodes 12 and 14. The alternating field produced by the opposite charges on the anodes 12 and 14 will also be small at both the cathode 4 and the control electrodes 8 and 10. This is due to the great attenuation of such alternating fields at a distance from the electrode pairs. The impedances mutual to either control electrode and an anode are small, owing to the shielding effect of the other control electrode and the other anode. The same is true for the impedances mutual to the cathode, the control electrodes, and the anodes. The smallness of such mutual impedances is desirable to reduce the resulting coupling between the input and output circuits connected to the electrodes.

Another advantage of the tube here described is the fact that the output voltages and currents drawn from the anodes 12 and 14 are balanced—that is, they are equal and opposite—even though the alternating input potentials impressed between the control electrodes 8 and 10 may be unbalanced—that is, of unequal magnitudes—with respect to the cathode.

The spacing of the electrodes suitable for efficient operation of the tube should be correctly chosen with respect to the highest frequency of operation. If the control electrodes 8 and 10 should be too far apart for this highest frequency, the electrons, as they travel between the electrodes 8 and 10, will be deflected, in quick succession, first, towards one, and then toward the other, of the control electrodes 8 and 10, as a consequence of the rapidly alternating forces acting upon the electrons. The result would be that the electrons would ultimately travel with reduced deflection, instead of along the path 36, without reaching either the anode 12 or the anode 14. This decrease of deflection may be avoided by having the distance between the cylindrical control electrodes 8 and 10 less than the order of magnitude of the quotient: electron-velocity component between and perpendicular to the control electrodes divided by the highest frequency of operation. With such control electrodes, the major part of the deflection of the electrons will be produced within a space as wide, along the electron path, as the separation of the control electrodes 8 and 10. This space may be made so confined as to be traversed by the electrons in a time the order of magnitude of which is shorter than one period of the highest frequency of operation. This leads immediately to the aforementioned dimensioning condition. In those modifications of the tube in which extremely high-frequency output is desired at the anodes 12 and 14, the spacing between these anodes should be less than the order of magnitude of the quotient: electron-velocity component at the anodes, in a direction perpendicular to these anodes, at the anodes divided by the highest frequency of operation.

The times of electron transit through the small control-electrode region and, when desirable, also through the anode region, may be made very small by suitable dimensioning of the electrode elements, thus keeping the efficiency high. The tube dimensions are otherwise independent of the wavelength or the frequency. In particular, the tube electrodes may be made as long axially as is suitable to obtain any desired amount of power, irrespective of the frequency of operation. This is a great advantage since the size of the electrodes of ordinary tubes for extremely high frequencies is limited to the order of magnitude of the wavelengths employed, as is well known to the art. This invention thus frees the new type of electron tube from these present limitations.

Accordingly, a tube operating near a frequency of 750 megacycles per second might have a spacing less than 2 millimeters between the control electrodes, if these control electrodes are operated with a mean potential of +6 volts with respect to the cathode, which would produce electron velocities between the control electrodes of about 1500 kilometers per second.

For good utilization of the electron stream, the electrons should reach the anodes 12 and 14 in more or less sharply defined groups of beams. Electron streams too broad transversely would result in covering both anodes 12 and 14 at all times, and this would not produce any changes of current at the anodes. In order to obtain the maximum steepness of the anode-current characteristic with respect to the control-electrode potential difference, the electrons may be focused into suitably sharp beams, with the foci near the anodes 12 and 14. This may be effected by choosing the mean value of the potentials of the control electrodes 8 and 10 with respect to the cathode, as by a suitable focusing or biasing battery 22, in such manner that the beams of electrons formed in the tube shall converge to produce a focus effect at the anode region. The cylindrical shape of the electrodes 8 and 10 may improve the focusing. Separate focusing electrodes may also be employed.

Specifically, the distance of the focus from the control-electrode region is essentially determined by the ratio of the mean values of the potentials of adjacent control-electrode elements and the mean values of the potentials of adjacent anode elements, where the cathode is taken at zero potential. If the position of the focus is to remain unaltered, and the emission from the cathode is to be varied, both the mean-grid and the mean-anode potentials should be changed in such manner that their ratio would remain fixed.

In the systems of all the figures, the control electrodes, therefore, may serve not only to deflect the electron streams, but also to focus them into beams converging toward the anodes. The deflecting function is brought about by the difference of potential between the adjacently disposed control electrodes. The focusing of the electron streams into sheets or beams of suitable width is brought about by a proper mean potential of the control electrodes with respect to the cathode.

Additional focusing electrodes 51 and 53 may, however, be employed, as illustrated in Fig. 3. One, the electrode 51, is shown near the cathode, biased negatively, and acting so as to send the electrons near the control electrodes 8 and 10. The other, the electrode 53, is shown beyond the anodes 12 and 14, biased correctly to let the majority of the electrons reach the anodes. This electrode 53 may also act to prevent secondary electron emission from the anodes 12 and 14, or to collect those electrons not reaching the anodes, in a manner well-known to the art.

The tube described may be used for amplification, the generation of extremely-high-frequency oscillations, frequency multiplication, detection, and the like. If, for frequency-multiplication purposes, for example, it is desired that the output frequency in the transformer 28 shall be two or three or four or any other integral number of times that of the input frequency in the transformer 18, the electron currents arriving at the anodes 12 and 14 should be in step with every second or third or fourth or other integral wave of the natural oscillations possible on the anodes 12 and 14. If the electron currents arriving at the anodes are non-linear functions of the control-electrode potential differences, as may be the case, the electron-current waves in space along the anodes and, therefore, also their oscillations in time, will contain frequencies which are multiples of the frequency applied to the control electrodes, as well as an average component of current varying with the amplitude of the applied frequency. From these currents, one or more frequencies may be selected, by appropriate filtering or tuning, and obtained at the output transformer 28. Such tuning may be effected in any well-known way, as, for example, by means of a condenser and a coil (not shown).

Frequency multiplication by even multiples may be accomplished more efficiently by placing the anode elements in parallel, and taking the output from these anode elements, as one pole, and a plate electrode, arranged beyond and between the anodes, as the other pole, as shown in the output circuits of Figs. 27 and 29. For frequency doubling, for example, the electron beam will reach the two anodes 12 and 14 together, twice within each cycle of the voltage applied to the control electrodes, therefore producing currents in the anodes 12 and 14 of twice the frequency applied to the control electrodes 8 and 10. Due to the non-linearity of the complete system, a rectified direct current or currents of still higher even harmonics may also be produced and selected.

For operation of the tube as a frequency multiplier, the natural wavelength of the oscillations on the anode elements should be a submultiple of the wave length of the oscillations of the electron beam reaching the anode, measured along the lengths of the elements. This condition may be fulfilled by having the times of propagation of the waves on all the electrodes approximately equal, and by arranging the control electrodes and the anodes parallel to one another, either in a cylindrical or a plane arrangement, with the active lengths of the control-electrodes and the anodes, and their wave velocities, approximately equal. Such filtering or tuning means may be constituted of a condenser 59 and a coil 57, as hereinafter described also in connection with Fig. 27. The condenser 59 may here be chosen with such a capacity as to tune the primary winding 57 to the frequency of such selected currents.

For rectification, the arrangement shown in Fig. 26 may be employed. The input circuit is similar to that described in connection with Fig. 1. The output circuit extends from the cathode 4, through the battery 32, to the anodes 12 and 14, connected in parallel. The heater connections to the cathode are omitted, as they are also in Figs. 27 to 29.

For rectification of extremely high frequencies, the two parallel anodes 12 and 14 may form one pole of the output terminals of the tube, the other pole being formed by the cathode. The majority of the electrons, in one cross-section, will reach one of the anodes 12 and 14 when either of the control electrodes 8 and 10 is provided with a region more positive than the other, but not when there are no charges on these control electrodes in the same cross-section. With an alternating voltage between the control electrodes, the electron beam in one cross section of the tube will thus alternately reach each of the anodes. Since this occurs independently of the polarity of the charges on the control electrodes in all the cross-sections of the tube of Fig. 26 where the input voltage differs sufficiently from zero, all the fluctuating beam currents reaching the anodes will add up to a total average anode current at the output terminals.

If, for detection of extremely high frequencies, the signal at the control electrodes is of so small a magnitude that the electron current reaches the two anodes during a small part only of each cycle, namely, during the maximum deflection, then, as the signal increases, the electron current will reach the anodes during a larger fraction of each cycle. The total number of electrons, and thus the average currents to the two anodes, will, therefore, increase and decrease with the change of magnitude of the incoming signal. This will result in demodulation or detection.

A circuit utilizing non-linear characteristics of the tube is illustrated in Fig. 27, which is similar to Fig. 26, except that the output circuit is provided with a transformer 55. The primary winding 57 of the transformer 55 is shown connected, in parallel with the condenser 59, across the anode 15 and the anodes 12 and 14 in parallel. Not only does a non-linear device of this character produce currents of harmonics of the input frequency, but it also produces rectification or detection, as the case may be, by variations of the average electrode currents in response to variations of amplitude of the high-frequency input. By proper choice of the capacity of the condenser 59, therefore, currents of a multiple of the input frequency, or the rectified and detected currents, may be caused to flow with considerable magnitude through the primary winding 57.

As an example, when the device is used as a detector, the average electron currents to the anodes 12 and 14 increase and decrease with the magnitude of the control-electrode signal, the average electron current reaching the anode 15 will decrease and increase in a complementary manner, and the combination of these currents in the output transformer 55 or any other well known coupling device will result in a larger output than that obtainable without the anode 15. The secondary winding 61 of the transformer 55 may be connected to a load (not shown) as, for example, an amplifier, a loud-speaker, or other device. The condenser 59 bypasses all frequencies higher than those selected for such a load, and may tune the primary 57 to such a selected frequency. For use of the output circuit of Fig. 27 in a detector circuit, the condenser 59 may be chosen with a sufficiently large capacity so that it shall effectively bypass the components of current of the frequencies of the signal applied to the control electrodes 8 and 10.

Generally, it is not essential, of course, that the tube contain only two control electrodes 8 and 10 and only two anodes 12 and 14. The number of control electrodes and anodes may be increased, as shown in Figs. 4 and 5, for example, thereby to increase still further the output of the system. In Figs. 14 and 15 and, in cross-section, in Figs. 4, 5, 28 and 29, there are shown a third control electrode 54 and a third cooperating anode 58, a fourth control electrode 56 cooperating with a fourth anode 60, further control electrodes 62 and 64, cooperating with further anodes 66 and 68, and so on. As many pairs of control electrodes and anodes symmetrically arranged may be employed as desired. In Fig. 4, a number of parallel electrodes, cooperating in pairs, are shown disposed cylindrically. Alternatively, they may all be arranged in planes opposite the plane cathode 4, as shown in Fig. 5, or in any other suitable way.

A further advantage of the circular or plane multiple arrangement is that the mutual impedances between the control electrodes, the anodes and the cathode will neutralize each other, to some extent, because the polarities of the potentials of the various electrodes are alternately distributed.

When using many control electrodes and anodes in a multiple arrangement, with one or with many cathodes, as in Fig. 29, there is no electrical limitation to the breadth or circumference of the electron tube, even at extremely high frequencies. The dimension which is limited by frequency is the spacing between adjacent control electrodes or adjacent anodes, and any decrease of these spacings necessary to reach extremely high frequencies may be counterbalanced by using a correspondingly larger number of individual elements. It is not necessary, therefore, to restrict the total length, or the breadth of the space occupied by the tube electrodes, or the distances of the control electrodes from the anodes and from the cathode, with respect to the highest frequency of operation. This is a great advantage when tubes for large amounts of power are required.

In Fig. 4, and similarly in Figs. 13, 14, 15, 26, 27, 28 and 29, the anodes are shown as flat strips in contrast to the round wire anodes in the other figures. The specific shape shown is not essential for the action of the tube, but naturally the current taken from the electron beam may be large with flat anodes, and the wave velocity of the oscillations on the electrodes will depend somewhat on their shape.

Where a plurality of control electrodes and anodes are employed, the control electrodes may be connected in parallel to the same input circuit, either outside or inside the tube. The input system into which the control electrodes are connected may therefore comprise either separate input circuits or the same input circuit. Figs. 6 and 7 show the connection of the control electrodes within the tube to a concentric line and a lecher line, respectively. In Fig. 6, the central conductor 70 of a coaxial transmission line, the outer conductor of which is shown at 72, is shown connected to alternately disposed electrodes 74, and the other conductor 72 is shown connected to the remaining electrodes 76. The coaxial line is sealed in the vacuum seal 78 of the tube. In Fig. 7, each of the alternately disposed electrodes 74 is shown connected to a wire 80 of a parallel-wire or lecher system and the other electrodes 76 to the other wire 82 of that system.

The same method of connection of the control electrodes by means of a lecher line is used in the tube of Fig. 14. In Fig. 14, the control electrodes 10, 54, 62, are shown connected by the wire 80 to one side of the secondary winding 16 of the input transformer 18, and the control electrodes 8, 56, 64 are shown connected by the wire 82 to the other side of the secondary winding of the input transformer 18, through the lecher line 80, 82. These control electrodes extend, together with their lead wires, substantially throughout the length of the tube 2, parallel to the cathode 4 which they surround.

Parallel to and surrounding the control electrodes are the anodes, connected in parallel, in the same manner as the control electrodes. The anodes 14, 58, 66 are connected together to one side of the primary 26 of the output transformer 28, and the anodes 12, 60, 68 are connected together to the other side of the same output transformer. The remaining connections correspond to those of the circuit of Fig. 1. The external system into which the anode electrodes are connected, like the input system into which the control electrodes are connected, may therefore comprise either separate circuits or the same circuits. The same applies also to the focusing system into which the cathodes are connected to the input system; this focusing system may comprise either separate focusing circuits or the same focusing circuit.

The relative locations of the parts and the relative spacing of the control electrodes and the anodes should be such that electrons emitted by the cathode 4 may travel between, and substantially perpendicular to, adjacent control electrodes, for example, the control electrodes 8 and 10, towards the corresponding and cooperating anodes, such as the anodes 12 and 14, shown in Figs. 4 and 14.

In Fig. 8, the electrodes 84 are shown connected in parallel to a wire 86 of a four-wire system, the electrodes 88 to a wire 90 of the four-wire system, and the electrodes 92 and 94 to the wires 96 and 98, respectively, of the four-wire system. This arrangement could be used, for example, with a revolving four-phase system of oscillations, or with the modulating or mixing system described hereafter. In Fig. 9, all the electrodes 100 are shown connected, each to a separate wire 102 of an external eight-wire system. The electrodes 100 are shown open-circuited at the end remote from the leads in the tube, as in Fig. 1. In Fig. 10, however, both ends of the electrodes 100 are shown connected to external eight-wire lines. As shown in Fig. 15 and in the diagrammatic showing of Fig. 11, the ends of the control electrodes 100, within the tube, may be connected by means of terminating impedances 105, or they may be merely short-circuited directly, as shown at 106, Fig. 12. Fig. 13 shows diagrammatically the arrangement of the anodes 108 and terminating impedances 104 which may be used in combination with the control electrodes 100 and terminations 105 of Fig. 11. Suitable matching or tuning of these electrodes, as by means of impedances, short-circuits, and open-ends is, of course, advisable and may be accomplished as shown either inside or outside of the tube.

It is well known to the art that the impedances connected to such lecher lines determine whether standing or traveling waves occur. In Fig. 1, for example, there is no additional impedance connected to the end of the control electrodes 8 and 10 nearest to the charges 50 and 52. Leaving these ends open will cause the waves to be stationary.

When the impedances 105 of Fig. 11, as another example, are equal to or match the characteristic impedance of the control electrodes 100, there will be no reflections of waves traveling along these electrodes, with the result that traveling waves will be produced on the electrodes 100. When the electrodes 100 are connected together by the short-circuit 106 of Fig. 12, on the other hand, complete reflection of the waves will occur, resulting in standing waves on these electrodes 100.

At very high frequencies where the quarter wavelength on the tube elements is less than the active-electrode length, the wavelength and the positions of the oscillations of the electron beam at the anode, measured in the direction of the length of the anode, and caused by the voltage or charge oscillations on the control electrodes, should be made approximately the same as the natural wavelength and the positions, respectively, of the oscillations of voltage and current on the anode elements, measured along the same direction. This condition may be fulfilled by arranging the anode and the control-electrode elements parallel to one another, either in a cylindrical or a plane arrangement, so that the active lengths of the control-electrode elements and the anode elements, as well as their wave velocity, are approximately equal, as shown in Figs. 4 and 5, and in Figs. 1, 14, 15, 16, 17, 30, and 31, and by proper matching, terminating and tuning, as illustrated in Figs. 1, 6, 7, 8, 9, 10, 11, 12, 13, 14, 15, 27, 28 and 29. The aforesaid conditions make use of the fact that the new transverse-control tube has distributed capacitance and distributed inductance in the electrically active parts of the tube, namely, in the controlling electrodes, the receiving anodes, and in the intermediate and adjacent regions containing the space charge of the electrons.

In the tube of Fig. 15, similar in some respects to Fig. 14, the same relative positions of the electrodes are used. The control electrodes are connected in parallel to the input transformer 18 in the same manner as described in connection with Fig. 14. The connections for the anodes, likewise connected in parallel to the primary winding 26 of the output transformer 28, are here shown leaving the tube 2 at the end opposite to the end where the connections to the control electrodes enter the tube. The free ends of the control electrodes, and also those of the anodes, are respectively terminated by impedances 105, 104, as also shown separately in Figs. 11 and 13. If these impedances are chosen of such value so as to eliminate reflections, at the terminated ends, of the electric waves traveling on the electrodes, the tube of Fig. 15 will be particularly well adapted for operation with traveling pulse waves of voltage and current. Electric waves reaching the primary winding 20 of the input transformer 18 will, on leaving the secondary winding 18 of this transformer, travel along the lead wires on to the control electrodes inside the tube. The pulse waves will then travel along these control electrodes towards the terminations 105 where they are absorbed. These traveling pulse waves on the control electrodes will deflect those electrons emitted from the cathode which are just passing through the electric field of these waves. Therefore, each of the electron beams, as illustrated in Fig. 25 for an oscillating wave, will move in the form of a traveling wave in a shape geometrically similar to the well-known traveling waves on a curtain of oscillating pendula. The deflected electrons, on reaching the anodes, will produce current and voltage waves on the anodes which will travel along the anodes in the same direction, with the same pulse shape and with the same velocity, as the waves on the control electrodes, in synchronism therewith. These waves on the anode will travel over the lead wires, out of the tube, to the primary winding 26 of the output transformer 28, and through the secondary winding 30, to any load (not shown) which may be connected. The terminating impedances 104 of the anodes may be used to exclude any waves moving in the opposite direction, thus to produce a traveling pulse wave.

The electrodes may, in another embodiment of the invention, shown, for example, in Fig. 28, be employed for polyphase operation, several phases of polyphase voltage being applied to input control electrodes 10, 8, 54, 56, 62, 64, etc., in cyclical sequence, and a corresponding number of phases may be taken, in the same sequence, from the output of the correspondingly connected anodes 14, 12, 58, 60, 66, 68, etc. The control electrodes, as well as the anodes, instead of being alternately connected together, as when used for single-phase currents and voltages, in the polyphase case are connected together cyclically in groups of three, four or more elements. The tube here acts to produce a succession of electron beams, resulting in a traveling or revolving distribution of space charges at the several anodes.

Fig. 28 shows the connections of such a tube for three-phase operation, illustrated by a three-phase oscillator. The control electrodes 10, 56, etc., are shown connected together to the secondary winding 110, the control electrodes 8, 62, etc., are connected together to the secondary winding 112, and the control electrodes 54, 64, etc., to the secondary winding 114 of the transformer 134, its secondary windings 110, 112 and 114 being arranged to supply the three phases of the extremely-high-frequency oscillations to the control electrodes. The focusing or biasing battery 22 is connected between the junction 124 of the secondary windings 110, 112 and 114 and the cathode 4, completing the input circuit.

The output circuit extends from the anodes 14 and 60, etc., in parallel to the primary winding 126 as one phase, the anodes 12 and 66, etc., to the primary winding 128 for the second phase, and from the anodes 58 and 68, etc., to the primary winding 130 for the third phase. The junction 132 of the primary windings 126, 128 and 130 is connected, through the battery or supply 32, to the cathode 4. The condensers 136 serve to tune the transformer 134 for the frequency generated, while a phase transposition 138 and a variable coupling 116 between the primary and secondary windings produce a self-excitation in the correct phase and magnitude for the oscillations, taking into account the various delay times including the transit time of the electrons. It is understood, of course, that any other tuning, phasing and coupling means may be used at high frequencies for this purpose.

Frequency conversion, modulating or mixing of two or more frequencies may also be provided for according to the present invention. The two or more frequencies to be mixed may be simultaneously impressed on the same pairs or sets of control electrodes, or they may be connected cyclically to different control electrodes; for example, three frequencies separately to every first, every second, and every third element, so that two or more sets of control electrodes may be used. Although the deflection of an electron beam passing between any two control electrodes is proportional to the difference of potential between these control electrodes, the currents of this electron beam reaching the corresponding anodes may be a non-linear function of that potential difference, due to the distribution of space charge within the beam. Such a non-linear tube will produce all kinds of sum and difference frequencies of which one or more may be selected by an appropriate filter.

A mixing circuit is illustrated in Fig. 29. This shows a part of a cross-section of a mixing tube, with many separate cathodes 4. The control electrodes 8, 64, etc., are connected to one side of the secondary winding 16, and the control electrode 56, etc., is shown connected to the other side of the same secondary winding 16, of an input transformer 18 the primary winding 20 of which is supplied with the first of the two frequencies, $f_1$, to be mixed. Similarly, the other frequency $f_2$ is supplied to the primary winding 220 of a second input transformer 218, and to the control electrodes 10, 62, etc., through one side of the secondary winding 216 and to the electrode 54, etc., through the other side. The focusing or bias battery 22 is shown connected between the cathodes 4 and the midpoints 24 and 224 of the secondary windings 16 and 216 of the input transformers 18 and 218.

The cathodes 4 are here shown consisting of a number of filaments opposite and parallel to every second space between the control electrodes. There are, therefore, only half as many cathodes or filaments as there are control electrodes. The anodes 12, 14, 58, 60, 66, 68 are all connected together, in parallel, to one pole of the output filter 140, while the other pole of the filter is connected to an additional plate 13 beyond the anodes, which will collect those electrons which pass between the anodes. This plate and the anodes are supplied from the battery 32 through the filter, the other end of the battery being connected to the cathodes 4. The pair of anode and control electrodes 12, 8, the pair 68, 64, etc., the control electrodes 8 and 64, etc., of which are connected to the said one side of the secondary winding 16 of the transformer 18, may be said to constitute a first group of pairs of anode and control electrodes. The pair of anode and control electrodes 60, 56, etc., the control electrodes 56, etc., of which are connected to the said other side of the said secondary winding 16, may be said to constitute a second group of pairs of anode and control electrodes. These two groups of pairs of anode and control electrodes may be said to constitute a first collection of groups of pairs of anode and control electrodes associated with a first input transformer 18.

The pair of anode and control electrodes 14, 10, the pair 66, 62, etc., the control electrodes 10, 62, etc., of which are connected to the said one side of the secondary winding 216 of the transformer 218, may be said to constitute another first group of pairs of anode and control electrodes. The pairs of anode and control electrodes 58, 54, etc., the control electrodes 54, etc., of which are connected to the said other side of the said secondary winding 216, may be said to constitute another second group of pairs of anode and control electrodes. These two second groups of pairs of anode and control electrodes may be said to constitute a second collection of groups of pairs of anode and control electrodes associated with the second input transformer 218.

The wave lengths of the desired components of the composite oscillations of the electron beams along the lengths of the anode electrode elements, and the natural wavelengths of the desired components of voltage and current on the anode electrode elements, should be substantially equal. This condition may be fulfilled by arranging the anode electrodes and the control-electrode elements parallel to one another in a cylindrical or a plane arrangement, so that the active lengths of the control-electrode and the anode elements, as well as their wave velocity, are substantially equal.

It is desirable, in all modifications of the tubes here described, that the leads between the electrodes within the tube and the external circuits shall match the characteristic impedance of the electrodes and that of the external circuits.

Either standing-wave or traveling-wave operation, or a combination of both, on the electrode elements, at fixed or varying frequencies, may be attained by the present invention, which is especially suited for the production, transformation and utilization of extremely high frequencies. Energy transfer or production is usually correlated with traveling waves conducted into or out of the tube.

Although the above description has been based, for concreteness, on the assumption that a continuous-wave voltage has been impressed upon the input circuits, the invention is equally applicable, of course, to use with pulsed or complex waves.

It is well known that pulsed or complex waves, in effect, are resultants of the Fourier addition of component waves of several frequencies. In the expression used in the claims, "of a frequency corresponding to a quarter wavelength," therefore, it is intended to include the significant frequency components of a pulsed or complex wave.

Further modifications will occur to persons skilled in the art, and all such are considered to fall within the spirit and scope of the invention, as defined in the appended claims.

What is claimed is:

1. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes, and means for taking output energy from the external circuit.

2. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and periodically to reverse the polarity of the charges, the input circuit and the control electrodes having impedances to render the charged regions stationary on the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes and to reverse the polarity of the charges on the anode-electrode regions in synchronism with the reversal of the polarity of the charges of the control-electrode regions, the external circuit and the anode electrodes having impedances to render the anode-electrode charged regions stationary on the anode electrodes, whereby the negatively and positively charged regions of the anode electrodes will respectively correspond to the alternately directed deflection zones to produce a transversely oscillating electron-beam wave-curtain, and means for taking output energy from the external circuit.

3. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode, the input circuit and the control electrodes having impedances to cause the charged regions to travel along the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, the external circuit and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce an electron-beam wave-curtain transversely oscillating in synchronism with the travel of the charged regions along the anode electrodes, and means for taking output energy from the external circuit.

4. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an electric wave the quarter-wavelength of which is smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes, and means for taking output energy from the external circuit.

5. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an electric wave the quarter-wavelength of which is smaller than the lengths of the electrodes to produce alternately disposed positive and negative charges in the successively disposed regions of one of the control electrodes and alternately disposed negative and positive charges, respectively, in the corresponding regions of the other control electrode and periodically to reverse the polarity of the charges, the input circuits and the control electrodes having impedances to render the charged regions stationary on the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes and to reverse the polarity of the charges on the anode-electrode regions in synchronism with the reversal of the polarity of the charges of the control-electrode regions, the external circuit and the anode electrodes having impedances to render the anode-electrode charged regions stationary on the anode electrodes, whereby the negatively and positively charged regions of the anode electrodes will respectively correspond to the alternately directed deflection zones to produce a transversely oscillating electron-beam wave-curtain, and means for taking output energy from the external circuit.

6. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an electric wave the quarter-wavelength of which is smaller than the lengths of the electrodes to produce alternately disposed positive and negative charges in the successively disposed regions of one of the control electrodes and alternately disposed negative and positive charges, respectively, in the corresponding regions of the other control electrode, the input circuit and the control electrodes having impedances to cause the charged regions to travel along the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, the external circuit and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce an electron-beam wave-curtain transversely oscillating in synchronism with the travel of the charged regions along the anode electrodes, and means for taking output energy from the external circuit.

7. An electric system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alternately disposed positive and negative charges in the successively disposed regions of the control electrodes and alternately disposed negative and positive charges in the said successively disposed regions of the control electrodes, means for causing electrons from the cathode means to travel past the control electrodes along paths disposed transversely to the control electrodes in order that they may become deflected by the control electrodes in deflection zones alternately directed toward the respective anode electrodes, and means for taking output energy from the external system.

8. An electric system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alternately disposed positive and negative charges in the successively disposed regions of the control electrodes and periodically to reverse the polarity of the charges, the input system and the control electrodes having impedances to render the charged regions stationary on the control electrodes, means for causing electrons from the cathode means to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrodes that respectively correspond to the negatively and positively charged regions of the control electrodes and to reverse the polarity of the charges on the anode-electrode regions in synchronism with the reversal of the polarity of the charges of the control-electrode regions, the external system and the anode electrodes having impedances to render the anode-electrode charged regions stationary on the anode electrodes, whereby the negatively and positively charged regions of the anode electrodes will respectively correspond to the alternately directed deflection zones to produce transversely oscillating electron-beam wave-curtains, and means for taking output energy from the external system.

9. An electric system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alterately disposed positive and negative charges in the successively disposed regions of the control electrodes, the input system and the control electrodes having impedances to cause the charged regions to travel along the control electrodes, means for causing electrons from the cathode means to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrodes that respectively correspond to the negatively and positively charged regions of the control electrodes, the external system and the anode electrodes having impedances to cause the charged regions of the anode electrodes to travel along the corresponding anode electrodes substantially in synchronism with the travel of the control-electrode charged regions along the control electrodes, whereby the negatively and positively charged regions of the anode electrodes will respectively correspond to the alternately directed deflection zones to produce electron-beam wave-curtains transversely oscillating in synchronism with the travel of the charged regions along the anode electrodes, and means for taking output energy from the external system.

10. An electric system, having, in combination, electron-tube apparatus having cathode means and two groups of pairs of anode and control electrodes, the control electrodes each having successively disposed regions respectively corresponding to regions of the anode electrode of the corresponding pair and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alternatively disposed positive and negative charges in the successively disposed regions of the control electrode of each pair of electrodes of one of the said groups and alternately disposed negative and positive charges, respectively, in the corresponding regions of the control electrode of each pair of electrodes of the other group and to produce alternately disposed negative and positive charges in the said successively disposed regions of the said control electrode of each pair of electrodes of the said one group and alternately disposed positive and negative charges, respectively, in the said corresponding regions of the control electrode of each pair of electrodes of the said other group, means for causing electrons from the cathode means to travel past the control electrodes along paths disposed transversely to the control electrodes in order that they may become deflected by the control electrodes in deflection zones alternately directed toward the anode electrodes of the respective groups, and means for taking output energy from the external system.

11. An electric system having, in combination, electron-tube apparatus having cathode means and two groups of pairs of anode and control electrodes, the control electrodes each having successively disposed regions respectively corresponding to regions of the anode electrode of the corresponding pair and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alternately disposed positive and negative charges in the successively disposed regions of the control electrode of each pair of electrodes of one and the said groups of alternately disposed negative and positive charges, respectively, in the corresponding regions of the control electrode of each pair of electrodes of the other group and periodically to reverse the polarity of the charges, the input system and the control electrodes having impedances to render the charged regions stationary on the control electrodes, means for causing electrons from the cathode means to travel past the control electrodes along paths disposed transversely to the control electrodes in order that they may become deflected by the control electrodes in deflection zones alternately directed toward the anode electrodes of the respective groups to correspond to the respective positively and negatively charged regions of the control electrodes, thereby to produce alternately disposed positive and negative charges, respectively, in the regions of the anode electrodes of each pair of electrodes that respectively correspond to the negatively and positively charged regions of the control electrodes of the corresponding pair of electrodes and to reverse the polarity of the charges on the anode-electrode regions in synchronism with the reversal of the polarity of the charges of the control-electrode regions, the external system and the anode electrodes having impedances to render the anode-electrode charged regions stationary on the anode electrodes, whereby the negatively and positively charged regions of the anode electrodes will respectively correspond to the alternately directed deflection zones to produce transversely oscillating electron-beam wave-curtains, and means for taking output energy from the external system.

12. An electric system having, in combination. electron-tube apparatus having cathode means and two groups of pairs of anode and control electrodes, the control electrodes each having successively disposed regions respectively corresponding to regions of the anode electrode of the corresponding pair and to regions of the other control electrodes, means connecting the control electrodes into an input system, means connecting the anode electrodes into an external system, means connecting the cathode means to the input system to provide a focusing system, means connecting the cathode means to the external system to provide a supply system, the focusing and supply systems being provided with sources of electricity, means for impressing upon the control electrodes an input voltage of a frequency corresponding to a quarter-wavelength smaller than the lengths of the electrodes to produce alternately disposed positive and negative charges in the successively disposed regions of the control electrode of each pair of electrodes of one of the said groups and alternately disposed negative and positive charges, respectively, in the corresponding regions of the control electrode of each pair of electrodes of the other group, the input system and the control electrodes having impedances to cause the charged regions to travel along the control electrodes, means for causing electrons from the cathode means to travel past the control electrodes along paths disposed transversely to the control electrodes in order that they may become deflected by the control electrodes in deflection zones alternately directed toward the anode electrodes of the respective groups to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, the external system and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce electron-beam wave-curtains transversely oscillating in synchronism with the travel of the charged regions along the anode electrodes, and means for taking output energy from the external system.

13. A polyphase system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into a plurality of input circuits, means connecting the anode electrodes into a plurality of external circuits, means connecting the cathode means to the input circuits to provide focusing circuits, means connecting the cathode means to the external circuits to provide supply circuits, the focusing and supply circuits being provided with sources of electricity, means for impressing upon the control electrodes, cyclically phase-displaced in the respective input circuits, input voltages of a frequency corresponding to a quarter-wavelength smaller than the lengths of the electrodes to produce alternately disposed positive and negative charges in the successively disposed regions of the control electrodes and alternately disposed negative and positive charges in the said successively disposed regions of the control electrodes, means for causing electrons from the cathode means to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce, cyclically phase-displaced in the respective external circuits, alternately disposed positive and negative charges, respectively, in the regions of the anode electrodes that respectively correspond to the negatively and positively charged regions of the control electrodes, whereby the negatively and positively charged regions of the anode electrodes will respectively correspond to the alternately directed deflection zones to produce transversely oscillating electron-beam wave-curtains, and means for taking polyphase output energy from the external circuits.

14. A polyphase system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into a plurality of input circuits, means connecting the anode electrodes into a plurality of external circuits, means connecting the cathode means to the input circuits to provide focusing circuits, means connecting the cathode means to the external circuits to provide supply circuits, the focusing and supply circuits being provided with sources of electricity, means for impressing upon the control electrodes, cyclically phase-displaced in the respective input circuits, input voltages of a frequency corresponding to a quarter-wavelength smaller than the lengths of the electrodes to produce alternately disposed positive and negative charges in the successively disposed regions of the control electrodes, the input circuits and the control electrodes having impedances to cause the charged regions to travel along the control electrodes, means for causing electrons from the cathode means to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce, cyclically phase-displaced in the respective external circuits, alternately disposed positive and negative charges, respectively, in the regions of the anode electrodes that respectively correspond to the negatively and positively charged regions of the control electrodes, the external circuits and the anode electrodes having impedances to cause the charged regions of the anode electrodes to travel along the corresponding anode electrodes substantially in synchronism with the control-electrode charged regions along the control electrodes, whereby the negatively and positively charged regions of the anode electrodes will respectively correspond to the alternately directed deflection zones to produce electron-beam wave-curtains transversely oscillating in synchronism with the travel of the charged regions along the anode electrodes, and means for taking polyphase output energy from the external circuits.

15. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes, the spacing between the control electrodes being less than the quotient obtained by dividing by the value of the frequency the value of the electron-velocity component between the control electrodes in a direction perpendicular to the control electrodes, and means for taking output energy from the external circuit.

16. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode, the input circuit and the control electrodes having impedances to cause the charged regions to travel along the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, the external circuit and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce an electron-beam wave-curtain transversely oscillating in synchronism with the travel of the charged regions along the anode electrodes, the spacing between the control electrodes being less than the quotient obtained by dividing by the value of the frequency the value of the electron-velocity component between the control electrodes in a direction perpendicular to the control electrodes, and means for taking output energy from the external circuit.

17. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, whereby the negatively and positively charged regions of the anode electrodes will respectively correspond to the alternately directed deflection zones to produce a transversely oscillating electron-beam wave-curtain, the spacing between the anodes being less than the quotient obtained by dividing by the value of the frequency the value of the electron-velocity component near and perpendicular to the anodes, and means for taking output energy from the external circuit.

18. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode, the input circuit and the control electrodes having impedances to cause the charged regions to travel along the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes. thereby to produce alternately disposed positive and negative charges, respectively, in the regions of the anode electrode of each pair of electrodes that respectively correspond to the negatively and positively charged regions of the control electrode of the corresponding pair of electrodes, the external circuit and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce an electron-beam wave-curtain transversely oscillating in synchronism with the travel of the charged regions along the anode electrodes, the spacing between the anodes being less than the quotient obtained by dividing by the value of the frequency the value of the electron-velocity component near and perpendicular to the anodes, anad means for taking output energy from the external circuit.

19. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes in parallel into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes, and means for taking output energy from the external circuit.

20. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes in parallel into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, an additional anode electrode disposed between the two first-named anode electrodes, means for causing electrons from the cathode to travel past the control electrodes along paths disposed transversely to the control electrodes in order that they may travel toward the additional electrode and become deflected by the control electrodes in deflection zones alternately directed toward the respective two first-named anode electrodes, and means for taking output energy from the external circuit.

21. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode and to produce alternately disposed negative and positive charges in the said successively disposed regions of the said one control electrode and alternately disposed positive and negative charges, respectively, in the said corresponding regions of the said other control electrode, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, whereby the negatively and positively charged regions of the anode electrodes will respectively correspond to the alternately directed deflection zones to produce a transversely oscillating electron-beam wave-curtain, means for taking output energy from the external circuit, and means for coupling a portion of the output energy to the input circuit.

22. An electric system having, in combination, an electron tube having a cathode and two pairs of anode and control electrodes, the control electrodes each having successively disposed regions respectively corresponding to regions of the anode electrode of each pair and to regions of the other control electrode, means connecting the control electrodes into an input circuit, means connecting the anode electrodes into an external circuit, means connecting the cathode to the input circuit to provide a focusing circuit, means connecting the cathode to the external circuit to provide a supply circuit, the focusing and supply circuits being provided with sources of electricity, means for impressing upon the control electrodes an input voltage of a frequency corresponding to a quarter-wavelength smaller than the lengths of the electrodes to produce alternately disposed positive and negative charges in the successively disposed regions of one of the control electrodes and alternately disposed negative and positive charges, respectively, in the corresponding regions of the other control electrode, the input circuit and the control electrodes having impedances to cause the charged regions to travel along the control electrodes, means for causing electrons from the cathode to travel past the control electrodes along paths disposed transversely to the control electrodes in order that they may become deflected by the control electrodes in deflection zones alternately directed toward the respective anode electrodes to correspond to the respective positively and negatively charged regions of the control electrodes, thereby to produce alternately disposed positive and negative charges, respectively, in the regions of the anode electrode of each pair of electrodes that respectively correspond to the negatively and positively charged regions of the control electrode of the corresponding pair of electrodes, the external circuit and the anode electrodes having impedances to cause the charged regions of the anode electrode of each pair of electrodes to travel along the corresponding anode electrode substantially in synchronism with the travel of the control-electrode charged regions along the control electrode of the corresponding pair of control electrodes, whereby the negatively and positively charged regions of the anode electrodes will respectively correspond to the alternately directed deflection zones to produce an electron-beam wave-curtain transversely oscillating in synchronism with the travel of the charged regions along the anode electrodes, means for taking output energy from the external circuit, and means for coupling a portion of the output energy to the input circuit.

23. An electric system having, in combination, electron-tube apparatus having cathode means and two collections each having two groups of pairs of anode and control electrodes, the control electrodes each having successively disposed regions respectively corresponding to regions of the anode electrode of the corresponding pair and to regions of the other control electrodes, means connecting the control electrodes of one collection into one input circuit, means connecting the control electrodes of the other collection into another input circuit, means connecting the anode electrodes into an external circuit, means connecting the cathode means to the input circuits to provide focusing circuits, means connecting the cathode means to the external circuit to provide a supply circuit, the focusing and supply circuits being provided with sources of electricity, means for impressing upon the control electrodes of one of the collections an input voltage of one frequency and upon the control electrodes of the other collection an input voltage of another frequency each corresponding to a quarter-wavelength smaller than the lengths of the electrodes to produce alternately disposed positive and negative charges in the successively disposed regions of the control electrode of each pair of electrodes of one of the groups of each collection and alternately disposed negative and positive charges, respectively, in the corresponding regions of the control electrode of each pair of electrodes of the other group of each collection and to produce alternately disposed negative and positive charges in the said successively disposed regions of the said control electrode of each pair of electrodes of each of the said one groups and alternately disposed positive and negative charges, respectively, in the said corresponding regions of the said control electrode of each pair of electrodes of each of the said other groups, means for causing electrons from the cathode means to travel past the control electrodes along paths disposed transversely to the control electrodes in order that they may become deflected by the control electrodes in deflection zones alternately directed toward the anode electrodes of the respective groups, and means for taking output energy from the external circuit.

24. A polyphase system having, in combination, electron-tube apparatus having cathode means, a plurality of anode electrodes and a plurality of control electrodes, the control electrodes each having successively disposed regions respectively corresponding to regions of the anode electrodes and to regions of the other control electrodes, means connecting the control electrodes into a plurality of input circuits, means connecting the anode electrodes into a plurality of external circuits, means connecting the cathode means to the input circuits to provide focusing circuits, means connecting the cathode means to the external circuits to provide supply circuits, the focusing and supply circuits being provided with sources of electricity, means for impressing upon the control electrodes, cyclically phase-displaced in the respective input circuits, input voltages of a frequency corresponding to a quarter-wavelength smaller than the lengths of the electrodes to produce alternately disposed positive and negative charges in the successively disposed regions of the control electrodes and alternately disposed negative and positive charges in the said successively disposed regions of the control electrodes, means for causing electrons from the cathode means to travel past the control electrodes along paths disposed transversely to the control electrodes in order that they may become deflected by the control electrodes in deflection zones alternately directed toward the respective anode electrodes, and means for taking polyphase output energy from the external circuits.

H. GÜNTHER RÜDENBERG.

REFERENCES CITED

The following references are of record in the file of this patent:

UNITED STATES PATENTS

| Number | Name | Date |
|---|---|---|
| 1,863,052 | Hund | June 14, 1932 |
| 2,020,310 | Gunn | Nov. 12, 1935 |
| 2,064,469 | Haeff | Dec. 15, 1936 |
| 2,096,459 | Kassner | Oct. 19, 1937 |
| 2,122,538 | Potter | July 5, 1938 |
| 2,129,669 | Bowen | Sept. 13, 1938 |
| 2,197,041 | Gray | Apr. 16, 1940 |
| 2,204,375 | Morrison | June 11, 1940 |
| 2,233,126 | Haeff | Feb. 25, 1941 |